United States Patent

Poitevin

[15] 3,646,589
[45] Feb. 29, 1972

[54] MULTIMODE TRACKING SYSTEM UTILIZING A CIRCULAR WAVEGUIDE HAVING SLOTS ANGULARLY ORIENTED WITH RESPECT TO THE WAVEGUIDE AXIS

[72] Inventor: Jean-Pierre R. Poitevin, 69, rue du Trosy, Clamart, France

[22] Filed: Dec. 15, 1969

[21] Appl. No.: 884,814

[30] Foreign Application Priority Data

Dec. 13, 1968 France....................................178238

[52] U.S. Cl............................................343/100 PE, 343/771
[51] Int. Cl..........................................................H04b 7/00
[58] Field of Search..............343/100 PE, 113, 117, 16 LS, 343/771, 782; 333/21

[56] References Cited

UNITED STATES PATENTS 3,530,471  9/1970  Mark...................................343/113 X
3,383,688  5/1968  Renaudie..............................343/113

Primary Examiner—Richard A. Farley
Assistant Examiner—J. M. Potenza
Attorney—Abraham A. Saffitz

[57] ABSTRACT

Improvement to systems for determining the position of a telecommunications satellite carrying a radiofrequency beacon transmitting signals of circular polarization of a given direction and in which, whenever the beacon is off the boresight axis of a circular horn antenna, the $TM_{01}$ mode is excited together with the $TE_{11}$ mode in the circular horn. The $TM_{01}$ and $TE_{11}$ modes are separated by a system including a circular feed waveguide for the horn, a pair of rectangular slots formed therein at two diametrically opposite points in a cross section of the waveguide, said slots having their longer sides respectively perpendicular to the direction of the magnetic field at those points of the $TE_{11}$ mode having said given direction of polarization, two rectangular section guides connected perpendicularly to the circular waveguide and having their long sides respectively parallel to the long sides of the slots so that the slots excite $TE_{10}$ mode waves in the rectangular waveguide, a magic T having two input waveguides respectively connected to the two rectangular waveguides, an output guide relating to the antisymmetrical waves in the input guides, at whose output the signal relating to the $TM_{01}$ mode is collected, and an output guide relating to the symmetrical waves in the input guides and comprising an absorber which absorbs the symmetrical waves.

2 Claims, 9 Drawing Figures

INVENTOR:
Jean-Pierre R. POITEVIN

MULTIMODE TRACKING SYSTEM UTILIZING A CIRCULAR WAVEGUIDE HAVING SLOTS ANGULARLY ORIENTED WITH RESPECT TO THE WAVEGUIDE AXIS

The invention relates to microwave multimode systems for tracking telecommunications satellites without interfering with the communications signals transmitted by the satellite in the form of right-hand or left-hand circularly polarized electromagnetic waves.

As is known, a ground system for tracking a telecommunications satellite transmitting circularly polarized electromagnetic waves can have an antenna consisting of a single frustoconical horn of circular cross section which can be used simultaneously for tracking the satellite and for transmitting information to the satellite and receiving information transmitted by the satellite. The signals picked up by the horn are transmitted by a circular waveguide to a suitable receiver, and the signals produced by a transmission device are transmitted by the waveguide and the horn so as to be radiated or beamed.

It is also known that, if the plane of the horn opening coincides with that of the plane wave transmitted by the satellite, circularly polarized waves of the $TE_{11}$ mode are propagated in the circular waveguide.

If the two planes do not coincide and if the circular waveguide is of suitable size, $TE_{11}$ mode and $TM_{01}$ mode waves are propagated inside it. The presence of the $TM_{01}$ waves indicates that the antenna axis is out of line with the satellite. It can be shown that the information about the relative phase and amplitude of the $TM_{01}$ mode with respect to the $TE_{11}$ mode are connected with the misalignment of the antenna axis with respect to the direction of the satellite, which is given by a beacon carried by the satellite, which transmits the signal used by the tracking system. Only waves of the $TE_{11}$ mode are used by the receiver connected to the circular waveguide.

An object of the invention is to provide such a microwave tracking system which is capable of extracting from the antenna the electromagnetic energy of the $TM_{01}$ mode so as to generate tracking signals, the information about the phase and amplitude of the $TE_{11}$ mode used as reference being taken by simple coupling and filtering at the output of the reception amplifier.

Another object of the invention is to design a system which can use the $TM_{01}$ mode to determine the misalignment of the antenna axis without taking electromagnetic energy from the circularly polarized $TE_{11}$ waves, without introducing distortion, and without injecting noise into the $TE_{11}$ mode waves in any part of the frequency band used for transmitting telecommunications information received from the satellite.

Prior art microwave multimode tracking systems comprise a circular waveguide section disposed between the horn and the "feeder" waveguide and formed with two diametrically opposite transverse slots on its wall. The slots are used to couple the waveguide section to a suitable microwave system which recombines the coupled waves and which can therefore, using the symmetry and asymmetry of the modes under consideration, separate information received on the $TM_{01}$ mode from information received on the $TE_{11}$ mode.

In such devices, the aforementioned requirements regarding noninterference with telecommunications information are satisfied by frequency filtering. To this end, the coupling slots are part of filtering cavities which can facilitate the coupling of the $TE_{11}$ and $TM_{01}$ modes at the beacon frequency and can eliminate the coupling of these modes almost completely at the frequencies of the band used for telecommunications.

Since the performance of such filters cannot be improved indefinitely, the device is effective only if the beacon frequency is relatively remote from the extreme frequencies of the band used for telecommunications. Furthermore, the beacon frequency cannot be changed without adjusting the filtering devices.

The device according to the invention differs from prior art devices in that the transverse coupling slots are replaced by slots or groups of slots which are oriented so as to be completely decoupled from the circularly polarized principal $TE_{11}$ mode which, as has been stated, conveys information from the satellite into the feeder guide.

The resulting decoupling is effective from the wall of the circular guide so that no distortion of the propagation time or mismatching affects the propagation of the $TE_{11}$ mode. Furthermore, the reinjection of noise from the tracking device does not affect the useful $TE_{11}$ mode, since the reinjection occurs partly in the $TM_{01}$ mode and partly in the oppositely polarized $TE_{11}$ mode.

The $TM_{01}$ mode, on the other hand, is coupled to the tracking device; the coupling can be increased by using a circular guide near cutoff for the $TM_{01}$ mode, resonant slots and cavity resonators. The use of recombination by symmetry has the following further effects:

a. The $TM_{01}$ mode can be separated from the oppositely polarized interfering $TE_{11}$ mode which is produced, for example, if there is a defect in the circularity of polarization transmitted by the satellite, in which case the interfering $TE_{11}$ mode is coupled to the tracking device;

b. Any contribution due to residual coupling of the circularly polarized $TE_{11}$ mode used for reception is eliminated.

Ground telecommunications stations generally use the same antenna for transmitting and receiving. The system must therefore also be sufficiently decoupled from the transmission frequencies not to introduce excessive mismatching or distortion of the signals transmitted by the station. The decoupling can be achieved by frequency filtering (the action of the aforementioned cavity or slot resonators for increasing the coupling of the $TM_{01}$ mode) or by the association of slots or systems of slots whose effects are compensated for the $TE_{11}$ mode at the transmission frequencies and are added together at the reception frequencies for the $TM_{01}$ mode.

Finally, the system according to the invention is such that the tracking frequency used can be as near as desired to the frequency band used for transmitting information from the satellite.

The invention can also, if required, be used to design tracking systems which do not need to be adjusted for any change of the beacon frequency.

A microwave tracking system according to the invention will now be described in detail with reference to the accompanying drawings, in which.

The circularly polarized $TE_{11}$ mode obtained by the superposition of two rectilinearly polarized $TE_{11}$ modes of equal amplitude, phase quadrature and having directions of polarization which are perpendicular, has cophasal longitudinal and traverse magnetic field components whose amplitudes are in the same ratio at each instant and at each point on the surface of the circular guide. One consequence is that the magnetic field of a circularly polarized $TE_{11}$ mode has an inclination with respect to the guide axis which remains constant at each instant and at each point on the guide wall.

Figure 2:
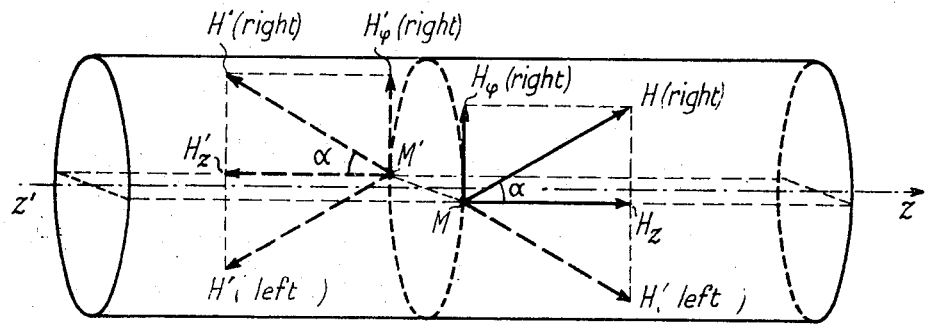
FIG. 2 shows the magnetic field components at two diametrically opposite points of a circular waveguide in the case of a right-hand or left-hand circularly polarized $TE_{11}$ mode wave.

FIG. 2 shows the magnetic field components in the case where the $TE_{11}$ mode wave has right-hand circular polarization, at the points M and M' on the wall of a circular wave guide 1 having an axis zz', points M and M' being diametrically opposed in a single cross section of the guide. At the point M, the longitudinal component $H_z$ is oriented in the direction of propagation when the component $H_\varphi$ tangential to the guide cross section at the point M extends upwards from M in the drawing. The field values $H_z$ and $H_\varphi$ are such that the resultant $H$ has a constant inclination $\alpha$ with respect to the component $H_z$ whose value depends on the wavelength $\lambda$ corresponding to the frequency used and to the radius R of guide 1. The angle is given by the expression:

$$tg\ \alpha = \frac{H_\varphi}{H_z} = \frac{3.412}{2\pi\lambda}[(3.412R)^2 - \lambda^2]^{1/2}$$

At the point M', the fields $H'_z$ and $H'_\varphi$ have the same values as point M and make the same angle therebetween, but their orientations are different. The longitudinal component $H'_z$ extends in the opposite direction to propagation, and the tangential component $H'_\varphi$ is parallel to $H_\varphi$. The direction of the resultant $H'$ is therefore symmetrical with the resultant $H$ with respect to the plane of the cross section of the guide extending through M and M'.

If the $TE_{11}$ mode wave has a left-hand circular polarization, the component $H_z$ has the same size and direction whereas the component $H_\varphi$ is opposite to the component $H_\varphi$ corresponding to right-hand circular polarization. The orientation of the resultant $H$ (left-hand circular polarization) is therefore symmetrical with respect to $H_z$ with the resultant $H$ shown in FIG. 2.

Figure 3:
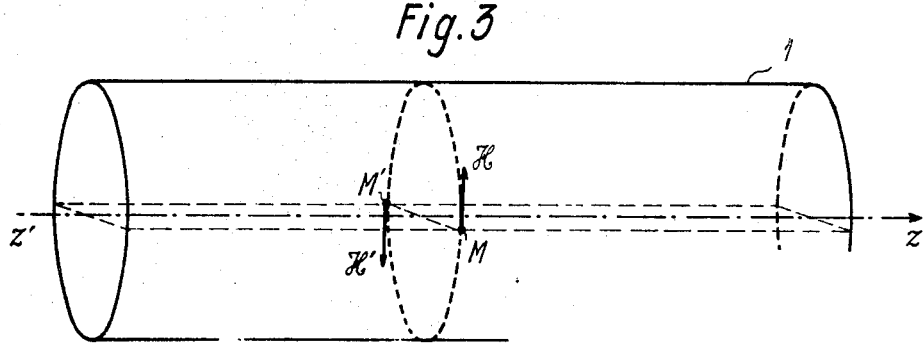
FIG. 3 shows the magnetic field components at two diametrically opposite points of a circular waveguide in the case of a $TM_{01}$ mode wave.

FIG. 3 shows the field $H$ of a $TM_{01}$ mode wave at a point M of the waveguide 1. The field is a transverse field. At the point M', the transverse field $H'$ is the same but in the opposite direction to $H$.

As is well known, a narrow rectangular slot in the wall of a guide is in practice coupled only to the magnetic component parallel to the long side of the slot. Consequently, it is possible to couple modes in a circular guide to an output load, with the exception of a given particular mode, by giving to the slot a long side perpendicular to the magnetic field of said particular mode.

Figure 4A:
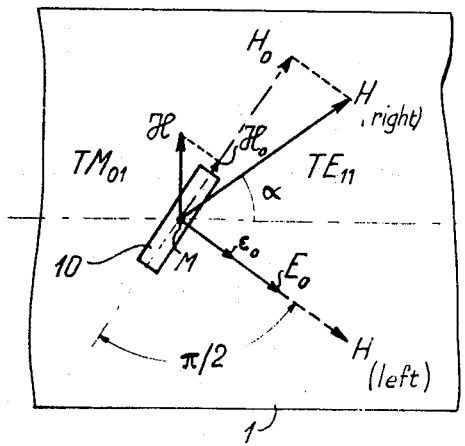
FIGS. 4a and 4b show the magnetic field components which produce the radiation of the slots cut in a circular waveguide at diametrically opposite points.

FIG. 4a shows a slot 10 of center M formed in guide 1 so that its long side is perpendicular to the resultant magnetic field $H$ of FIG. 2 corresponding to the magnetic field of a left-hand circularly polarized $TE_{11}$ wave which should not be coupled. In these conditions, the slot will be completely decoupled from the left-hand circularly polarized $TE_{11}$ wave. On the other hand, rectilinear electric lines of force $E_o$ will appear perpendicular to the long sides of slot 10, due to the presence of the component $H_o = H \sin 2\alpha$ of the magnetic field at the point M of the right-hand circularly polarized $TE_{11}$ wave.

If a $TM_{01}$ wave is simultaneously propagated in the guide 1, the presence of the component $H_o = H \cos \alpha$ at M, due to the $TM_{01}$ wave, will give rise to an electric field $\epsilon_o$ whose lines of force are perpendicular to the long sides of slot 10 and in the same directions as the electric lines of force $E_o$.

Figure 4B:
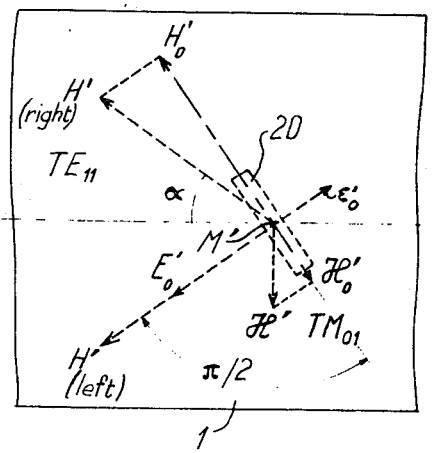

FIG. 4b shows a slot 20 whose center is a point M'. The slot is indicated by broken lines, since it is seen through the wall of guide 1.

The magnetic field component $H'$ at M' of the left-hand circularly polarized $TE_{11}$ wave which is not to be coupled has a different orientation from the component $H$ at the point M, so that the slot 20 must be oriented accordingly.

As in the case of FIG. 4a, the slot is not coupled to the left-hand circularly polarized $TE_{11}$ wave, and the presence of the component $H'_o = H' \sin 2\alpha$ gives an electric field $E'_o$ which is perpendicular to the two long sides of slot 20 and in the same direction as the (left) vector $H'$. The presence of the component $H'_o = H' \cos \alpha$ gives an electric field $\epsilon'_o$ whose lines of force are perpendicular to the long sides of slot 20 but in the opposite direction to the lines of force of the field $E'_o$.

As can be seen, the electric field components $E_o$ and $\epsilon_o$ are in the same direction in slot 10, whereas the corresponding components $E'_o$ and $\epsilon'_o$ are in opposite directions in slot 20.

These preliminary considerations are used to design the device for picking up the tracking signals from a telecommunications satellite without interfering with the reception of useful information transmitted by the satellite.

If two rectangular waveguides 11 and 21 whose terminal cross sections are formed with slots 10 and 20 (FIGS. 4a and 4b) are welded to the walls of circular waveguide 1, slots 10 and 20 radiate in the rectangular guides and give therein $TE_{10}$ mode waves.

If the tracking device is not suitably aimed at the satellite, a $TE_{10}$ wave produced by the $TM_{01}$ mode and a $TE_{10}$ wave produced by the $TE_{11}$ modes will be present in each rectangular waveguide. If the two waves are in phase in one rectangular waveguide, they will be in phase opposition in the other guide.

If, therefore, the two rectangular waveguides respectively are connected to the appropriate two arms of a magic T, the $TE_{10}$ waves produced by the presence of the $TE_{11}$ waves in the circular guide 1 can easily be separated from the $TE_{10}$ waves produced in the waveguide 1 by the $TM_{01}$ waves. Since the waves produced by the $TE_{11}$ waves are useless, the can be absorbed in a suitable load in the corresponding arm of the magic T.

Figure 1:
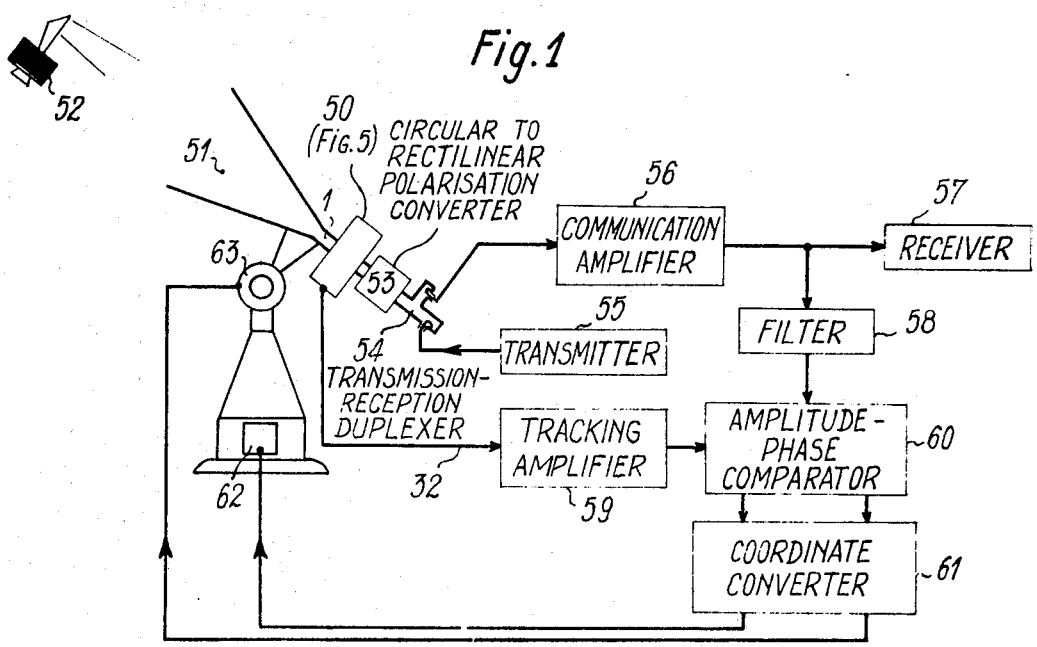
FIG. 1 shows a station for tracking satellites and for transmitting and receiving signals to and from the satellite.

On the other hand, the waves produced by the presence of the $TM_{01}$ waves can be used, after their amplitude and phase have been compared with part of the $TE_{11}$ wave received, to operate a rapid-response servomechanism which can act on the tracking device motors so as to realign the tracking system with the satellite, as will be seen from the description of FIG. 1.

Figure 6:
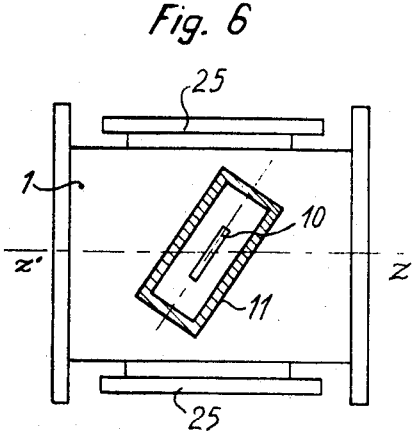
FIGS. 5 and 6 show a microwave system for picking up satellite tracking signals, according to the invention.
Figure 5:
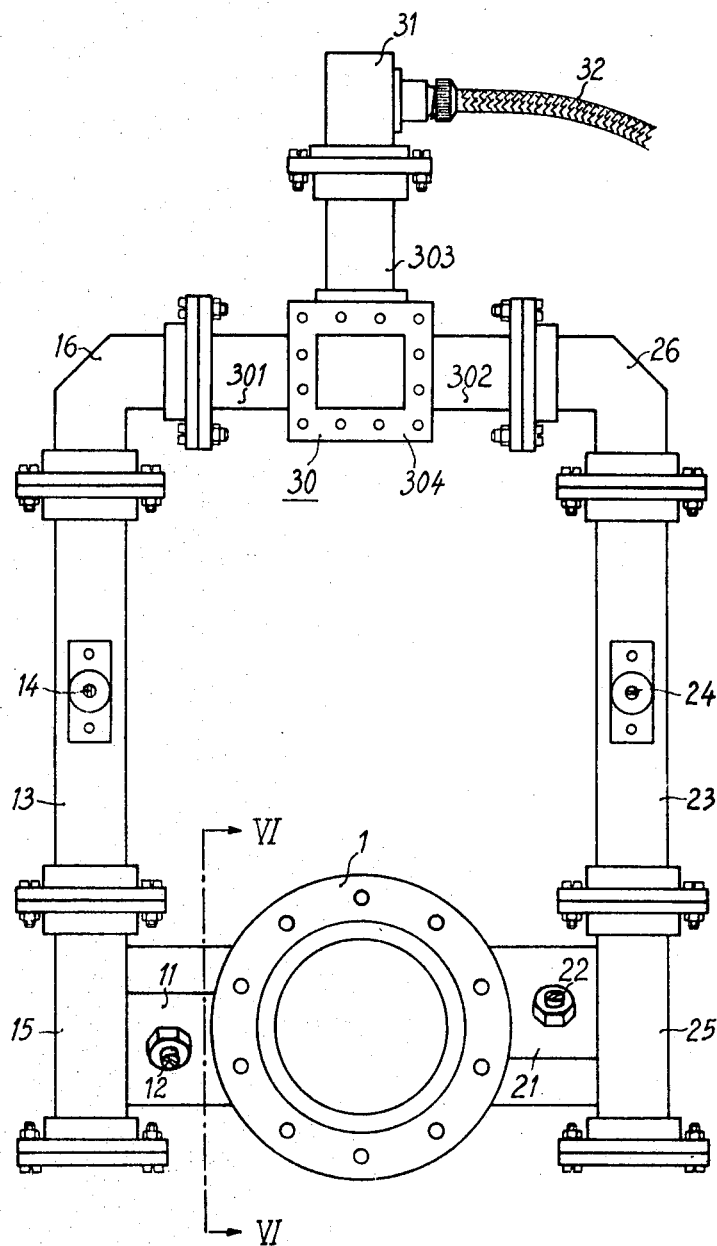

Referring now to FIG. 5, a circular waveguide portion 1 is formed with two narrow, diametrically opposite rectangular slots oriented as shown in FIGS. 4a and 4b. Two rectangular waveguides 11 and 21 are welded to the walls of guide 1. The centers of the cross sections of the rectangular waveguides 11 and 21 coincide with the centers of the slots, and the large faces of waveguides 11 and 21 are parallel to the long sides of slots 10 and 20, as seen in FIG. 6. FIG. 6 shows slot 10, since the waveguide 11, seen in end view, has been cut in cross section.

The guide portions 11 and 21 have dimensions suitable for forming cavity resonators, thus increasing the coupling to the beacon frequency. The cavities are tuned by tuning screws 12 and 22.

13 and 23 are conventional phase-shifting attenuators which can balance the waves from cavities 11 and 21 before their combination in the magic-T 30. The balancing is brought about by acting on the adjusting screws 14 and 24 which move the absorbent dielectric strips in the phase-shifting attenuators 13 and 23. Attenuator 13 is connected by a T 15 cavity 11 and by a bent guide 16 to the arm 301 of the magic-T 30. Similarly, the attenuator 23 is connected to cavity 21 by a T 25 and to the arm 302 of magic-T 30 by the bent guide 26.

When the aforementioned adjustments have been made, the $TE_{10}$ waves produced by the $TM_{01}$ waves by the misalignment of the device according to the invention are propagated in arms 301 and 302 of magic-T 30 so that the waves in guide 301 are in phase opposition to the waves in guide 302. Consequently, the two wave systems combine in the arm 303 of magic-T 30.

A conventional transition device 31 closes the arm 303 of magic-T 30, so that the tracking signals can be transmitted to the tracking receiver by a coaxial cable 32, as shown in FIG. 1.

Waves $TE_{10}$, which are produced by waves $TE_{11}$ and are propagated likewise in arms 301 and 302 of magic-T 30, combine in arm 304 (shown in end view in FIG. 5) since the two wave systems are in phase. Arm 304 has a matched termination which absorbs the energy of the useless $TE_{10}$ waves.

It should be noted that the mode coupler used in the system according to the invention eliminates one circularly polarized mode from the wall of circular guide 1, so that, unlike the case of prior art devices which eliminate the coupling by the use of symmetry and antisymmetry, no mismatching or distortion of the group propagation time due to the mode coupler are introduced for the circular polarization mode used for the reception of telecommunications information.

Furthermore, since the inclination of the magnetic field in waveguide 1 is independent of the direction of propagation in the guide, the direction of polarization of the decoupled circular polarized wave (left hand or right hand) is the same independently of the direction in which the waves are propagated inside the circular waveguide 1. If the mode coupler according to the invention is completely decoupled from the left-hand circularly polarized $TE_{11}$ mode, the decoupling persists either if the waves travel from left to right or from right to left in the circular waveguide 1.

A converse result is that the same direction of circular polarization (left hand in FIG. 2) cannot be excited from the coupling slots 10 and 20, either towards the left or the right extremity of the circular guide 1. Consequently, the noise coming from the tracking system will not affect that amongst the two possible circularly polarized $TE_{11}$ modes selected for reception. On the other hand, the coupler is coupled to the $TE_{11}$ mode of opposite circular polarization and to the other modes in which electromagnetic energy can flow in the guide under consideration.

It should also be noted that, theoretically, wave decoupling cannot be infinite except at one frequency.

When the device according to the invention is used for frequencies near the frequency of maximum decoupling, the expression (1), given previously, shows that:

$$\frac{d(tg\ \alpha)}{tg\ \alpha} = \frac{2d\alpha}{\sin 2\alpha} = \frac{1}{1-\left(\frac{\lambda}{3.412R}\right)^2} \cdot \frac{d\lambda}{\lambda} \quad (2)$$

The residual coupling of a slot 10 perpendicular to the direction made by an angle $\alpha$ with the axis of the circular guide 1 will be proportional to $\sin (d\alpha) \approx d\alpha$. If, therefore, the wave at the wavelength $\lambda$ is completely decoupled, the wave at the wavelength $(\lambda + d\lambda)$ has the following coupling:

$$d\alpha = \frac{1}{2} \sin 2\alpha \frac{1}{1-(\lambda/3.412R)^2} \cdot \frac{d\lambda}{\lambda} \quad (3)$$

corresponding to a supplementary power decoupling of at least 26 decibels in a relative frequency band of ±6 percent round the central frequency for waveguide dimensions which will be given hereinafter.

It will be recalled that the minimum supplementary decoupling of 26 decibels characterizes the maximum interference to the propagation of a $TE_{11}$ wave used by the telecommunications receiver, but that the use of symmetrical recombination considerably reinforces this attenuation for a tracking signal taken on the $TM_{01}$ mode.

The aforementioned theoretical considerations are closely confirmed by experience.

A system for picking up tracking signals according to the invention which gave satisfactory results gave the following performance in the whole frequency band (3,700–4,200 MHz):

1. The coupling of the $TM_{01}$ mode was better than 4 decibels;
2. The decoupling of the left-hand circular $TE_{11}$ mode was better than 30 decibels; and
3. The relative decoupling at the outlet of arm 303 of magic-T 14 between $TE_{10}$ waves generated by $TM_{01}$ waves and $TE_{10}$ waves generated by the right-hand or left-hand circular $TE_{11}$ waves was greater than 50 decibels.

These results were obtained with slots 20 mm. long and 2 mm. wide, cut in a circular waveguide 66.5 mm. in diameter and at an angle of $90° - \alpha = 58°$ to the horizontal.

The cavities 11 and 21 had the following dimensions:
Cross section: 57×22 mm.
Length: 41.8 mm.

The device according to the invention has variant forms.

Figure 7:
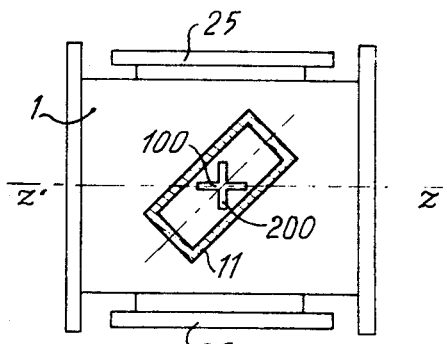
FIG. 7 shows a variant of the invention.

For example, as FIG. 7 shows, a longitudinal slot 100 parallel to the axis $zz'$ of the circular waveguide 1 and a transverse slot 200 can be used for coupling, in which case the waveguides 11 and 21 act as a "polarization analyser." This is because the recombining of the longitudinal and transverse magnetic fields coupled across the slots 100, 200 gives a magnetic field in a fixed direction at an angle with respect to the axis $zz'$ which depends not only on the relative values of the transverse and longitudinal components of the magnetic field in the circular waveguide 1, but also on the relative dimensions of the two slots 100 and 200. It is thus possible, by varying the relative dimensions of the slots, to alter the inclination of the resultant magnetic field after coupling, e.g., to 58° with respect to the cross section plane.

If the dimensions of a rectangular waveguide such as 11 are such that only the $TE_{10}$ mode can propagate inside it, the waveguide is coupled only to the component of the transverse magnetic field which is parallel to its long side. It can therefore be used as a "rectilinear polarization analyser" and can therefore completely eliminate the resultant rectilinear magnetic component corresponding to a given direction of circular polarization in the circular waveguide 1. To this end, it is sufficient to connect a rectangular guide 11 whose axis is perpendicular to that of the circular waveguide 1 and whose long side is perpendicular to the resultant magnetic field corresponding to the direction of circular polarization which it is desired not to couple.

The use of cavity resonators and of balancing phase-shifting attenuators can likewise be avoided, thus eliminating the need for any adjustment during a change of beacon frequency by providing slots such as 10, 20 or 100, 200 of dimensions such that they are resonators. The slots, in association with other slot resonators in the output guides 11, 21, can form resonating iris bandpass filters covering e.g., the 3,700–4,200 MHz. band.

It will also be noted that a number of slots, such as those described in connection with FIGS. 4a and 4b, can be associated so as to combine the decoupling effect in a given direction of polarization with a "directivity" effect similar to that encountered in microwave systems called "directive couplers."

Figure 8:
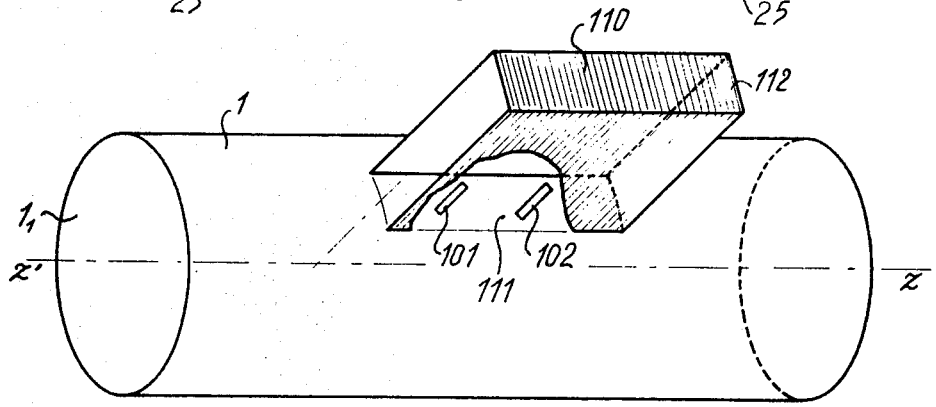
FIG. 8 shows how a system of regularly spaced, suitably oriented slots can be used to construct a directional coupler for use in the coupling system according to the invention.

FIG. 8 shows a directive coupler between the $TM_{01}$ mode, which is propagated in the circular waveguide 1, and the $TE_{10}$ mode of a given rectangular waveguide 110, which performs the same function as guide 11 in FIG. 5. The small surface 111 of the rectangular waveguide 110 is connected to the circular waveguide 1, and slots such as 101, 102 are cut in the surface 111 common to the two guides. If the slots 101, 102 are separated by a distance equal to $\lambda_g/4$ in the two guides ($\lambda_g$ being the common wavelength in the two guides corresponding to the beacon frequency), so that the long side $a$ of the cross section of the rectangular waveguide 110 conforms to the following relationship:

$$a \approx 1.3\ R$$

$R$ being the radius of the circular waveguide 1, the resulting construction is a directive coupler between the $TM_{01}$ mode at the input $1_1$ of waveguide 1 and the $TE_{10}$ mode at the input 112 of waveguide 110. The left-hand circularly polarized $TE_{11}$ mode travels through the aforementioned coupler without any interference in either direction of propagation.

Referring now to FIG. 1, a communications satellite 52 transmits a beacon wave and a communication wave. The two waves are picked up by a conical horn 51 connected to a circular wave guide 1. A mode coupler 50 described in connection with FIG. 5, and a device 53 for converting circular to rectilinear polarization, are disposed on waveguide 1. The output waveguide of device 53, in which a transmission wave and a reception waves of the $TE_{11}$ mode having respectively intersecting rectilinear polarization can be propagated, is connected to a transmitter 55 and to a receiving amplifier 56. Amplifier 56 is connected to receiver 57 and to a filter 58, which is tuned to the beacon frequency.

The coaxial cable 32 leaving the mode coupler 50 is connected to the tracking amplifier 59, and the outputs of filter 58 and amplifier 59 are connected to an amplitude and phase comparator 60, which in known manner supplies a signal showing the amplitude ratio and a signal showing the phase difference, which are applied to a coordinates transformer 61. The azimuth and elevation signals generated by the circuit 61 are applied respectively to motors 62 and 63 which align the horn 51.

What I claim is:

1. In a system for determining the position of a mobile beacon transmitting signals of circular polarization with respect to a circular tracking horn and in which, whenever the beacon is off the horn boresight axis, the $TM_{01}$ mode is excited together with the $TE_{11}$ mode in the circular horn, a device for separating the $TM_{01}$ mode wave from the $TE_{11}$ mode wave having a determined direction of circular polarization, said device including a circular feed waveguide for said horn, a pair of rectangular slots formed in said circular waveguide at two diametrically opposite points in a cross section of the waveguide symmetrically oriented with respect to said cross section and the longer sides of which are angularly shifted with respect to the axis of said circular feed waveguide by an angle $\alpha$ given by the formula:

$$\cot \alpha = \frac{3.412}{2\pi\lambda} [(3.412R)^2 - \lambda^2]^{1/2}$$

where $\lambda$ is the used wavelength and $R$ is the radius of said circular waveguide, two rectangular section guides connected perpendicularly to the circular waveguide and having their long sides respectively parallel to, the long sides of the slots so that the slots excite $TE_{10}$ waves in the rectangular waveguide, a magic T having two input waveguides respectively connected to the two rectangular waveguides, an output guide, relating to the antisymmetrical waves in the input guides, at whose output the signal relating to the $TM_{01}$ wave is collected, and an output guide, relating to the symmetrical waves in the input guides, and comprising an absorber which absorbs the symmetrical waves.

2. A mode separating device as claimed in claim 1 in which said circular waveguide has two sets of said rectangular slots arranged in diametrically opposite pairs and coupled to two rectangular guides connected perpendicularly to said circular waveguide, the distance between consecutive slots of a set being equal to $\lambda g/4$, where $\lambda g$, is the common wavelength in the circular and rectangular waveguides.

* * * * *